United States Patent [19]

Gorman et al.

[11] Patent Number: 4,921,625

[45] Date of Patent: May 1, 1990

[54] METHOD FOR PREPARING FUNCTIONALIZED BLOCK COPOLYMERS

[75] Inventors: John E. Gorman, Houston; John A. Morris, Katy, both of Tex.

[73] Assignee: Shell Oil Company, Houston, Tex.

[21] Appl. No.: 211,748

[22] Filed: Jun. 27, 1988

[51] Int. Cl.$^5$ ................ C10M 107/02; C10M 145/10
[52] U.S. Cl. .................... 252/56 D; 252/56 R; 252/56 S; 525/526.1; 525/192; 525/197; 525/301; 585/12
[58] Field of Search ............ 252/56 S, 56 R, 56 D; 525/192, 197, 301, 326.1; 585/12

[56] References Cited

U.S. PATENT DOCUMENTS

| | | | |
|---|---|---|---|
| 4,160,739 | 7/1979 | Slambaugh et al. | 252/56 D |
| 4,533,482 | 8/1985 | Bollinger | 252/56 R |
| 4,693,838 | 9/1987 | Varma et al. | 252/51.5 R |
| 4,749,505 | 6/1988 | Chung et al. | 252/56 R |
| 4,780,228 | 10/1988 | Gardiner et al. | 252/56 R |
| 4,803,003 | 2/1989 | Chung | 252/56 R |
| 4,822,508 | 4/1989 | Pennewiss et al. | 252/56 R |

Primary Examiner—Jacqueline V. Howard

[57] ABSTRACT

A process for incorporating carboxy and/or carboxyl derivative functionality into a hydrocarbon polymer which is substantially free of ethylenic unsaturation. The functionalization is accomplished by contacting the functionalizing agent or agents with the polymer in the presence of a free radical initiator in a blending apparatus capable of imparting high mechanical energy into the reaction medium. The blending apparatus is preferably an extruder and most preferably a non-intermeshing twin screw extruder. The amount of degradation resulting from the presence of a free radical initiator and the high mechanical shear at the elevated temperatures employed during the contacting is reduced by effecting the contacting in a suitable diluent. Similarly, the amount of polymer crosslinking and/or coupling is reduced through the use of a suitable diluent. The polymer is maintained in the molten phase during the reaction.

12 Claims, 1 Drawing Sheet

METHOD FOR PREPARING FUNCTIONALIZED BLOCK COPOLYMERS

BACKGROUND

1. Field of the Invention

This invention relates to a method for functionalizing block copolymers. More particularly, this invention relates to a process for incorporating carboxyl and carboxyl derivative functionality into a block copolymer.

2. Prior Art

Polymers modified so as to contain a carboxylic acid group or a derivative thereof are, of course, well known in the prior art. For example, polymers containing ethylenic unsaturation can be modified by reacting the polymer with an unsaturated carboxylic acid or a derivative thereof thermally through the so called ENE reaction as taught, for example, in U.S. Pat. Nos. 4,292,414; 4,308,353 and 4,427,828. When the ethylenic unsaturated polymer is modified in this manner, the unsaturated carboxylic acid or a derivative thereof is, in effect, grafted onto the polymer chain at a carbon atom allylic to an ethylenic unsaturation contained in the polymer. Ethylenically unsaturated polymers may also be modified through free radical addition of an unsaturated carboxylic acid across an ethylenic double bond contained in the polymer. Such free radical addition may be accomplished in the presence of a free radical initiator, generally at temperatures within the range from about 160° to about 230° C. Saturated polymers, i.e., polymers which are free or at least substantially free of ethylenic unsaturation, can also be modified by grafting an ethylenically unsaturated acid or a derivative thereof onto the polymer in the presence of a free radical initiator as taught, for example, in U.S. Pat. Nos. 4,578,429; 4,632,769 and 4,678,173 and European Patent Application No. 0171167. When saturated polymers containing hydrogenated conjugated diolefin monomer units are modified, however, the acid or acid derivative is grafted to the polymer at a secondary or tertiary carbon position as taught in U.S. Pat. No. 4,578,429 or at the site of a chain scission as taught in U.S. Pat. No. 4,670,173.

Polymers containing a grafted carboxylic acid compound or a derivative thereof are, of course, known to be useful as impact modifiers in both thermosetting and thermoplastic resin molding compositions such as taught, for example, in U.S. Pat. Nos. 4,329,438 and 4,628,072. Such polymers may also be further modified so as to produce viscosity index improvers having dispersant characteristics as taught, for example, in U.S. Pat. Nos. 4,033,888; 4,077,893; 4,141,847 and 4,670,173. Such modified polymers also exhibit improved adhesive properties and are useful in a rather broad range of adhesive, sealant, coating and related uses.

As indicated in at least certain of the aforementioned U.S. Patents, polymers which are modified so as to incorporate a carboxylic acid compound or a derivative thereof may be prepared using solution techniques. These techniques, however, generally require extended holding times and unless relatively high temperatures are employed the amount of the carboxylic acid compound or its derivative incorporated in the polymer is generally low. Polymers containing a carboxylic acid compound or a derivative thereof may also be prepared by contacting the polymer with an unsaturated carboxylic acid or a derivative thereof in an extruder, generally in the presence of a free radical initiator, as taught, for example, in U.S. Pat. Nos. 4,578,429; 4,632,769 and 4,670,173 and European Patent Application No. 0171167. This technique, will of course, reduce the holding time required to effect the reaction and can, generally, increase the amount of carboxylic acid or derivative thereof incorporated into the polymer. As indicated in U.S. Pat. No. 4,670,173, however, this method of preparing the modified polymer results in chained scission of the polymer thereby reducing the polymers molecular weight. Moreover, when the chain scission occurs in the central block of a triblock copolymer such scission can significantly impair the polymer's performance. It is also known that the contacting of a polymer and a free radical initiator in an extruder can result in significant coupling or crosslinking of the polymer. It has now been discovered that degradation (scissioning) of the polymer is significantly greater when the polymer to be modified in an extruder is a radial polymer as opposed to a linear polymer. Degradation (scissioning) is, of course, a significant debit when the modified polymer is ultimately to be used as a viscosity index improver since the resulting reduced molecular weight will significantly reduce thickening efficiency. Also, coupling or crosslinking could lead to the production of polymeric materials which are not soluble in the oil composition which might contain the viscosity index improver. An improved process for modifying hydrocarbon copolymers, and particularly copolymers which are ultimately to be used as viscosity index improvers, which will result in less degradation and/or coupling or crosslinking while at the same time requiring reduced holding times, is, therefore, believed to be readily apparent.

SUMMARY OF THE INVENTION

It has now been discovered that the foregoing and other disadvantages of the prior art processes for preparing polymers which are modified so as to incorporate a carboxylic acid compound or a derivative thereof can be overcome or at least significantly reduced with the process of this invention. It is, therefore, an object of the present invention to provide an improved process for preparing polymers which are modified so as to incorporate a carboxylic acid compound or a derivative of such a carboxylic acid compound. It is another object of this invention to provide such a process requiring minimal holding times to effect the grafting reaction. It is still another object of this invention to provide such a process which will yield a modified polymer product having less degraded and/or coupled or crosslinked polymer therein than has heretofore been contained in functionalized polymers prepared in an extruder. The foregoing and other objects and advantages will become apparent from the description set forth hereinafter.

In accordance with the present invention, the foregoing and other objects and advantages are accomplished by completing the grafting reaction in the molten phase and in a blending device capable of imparting high mechanical energy and in the presence of a suitable diluent. Suitable diluents include liquid hydrocarbons having molecular weights of at least 120 and a boiling point of at least 230° C. A suitable diluent may be a pure compound but will, generally, be a blend of compounds such as a petroleum distillate fraction. In general, when the suitable diluent is a petroleum distillation fraction, the distillate fraction will, generally, have an initial boiling point within the range from about 230° to about 300° C. and a final boiling point within the range from about 600° to about 900° C.

DETAILED DESCRIPTION OF THE INVENTION

Figure 1:
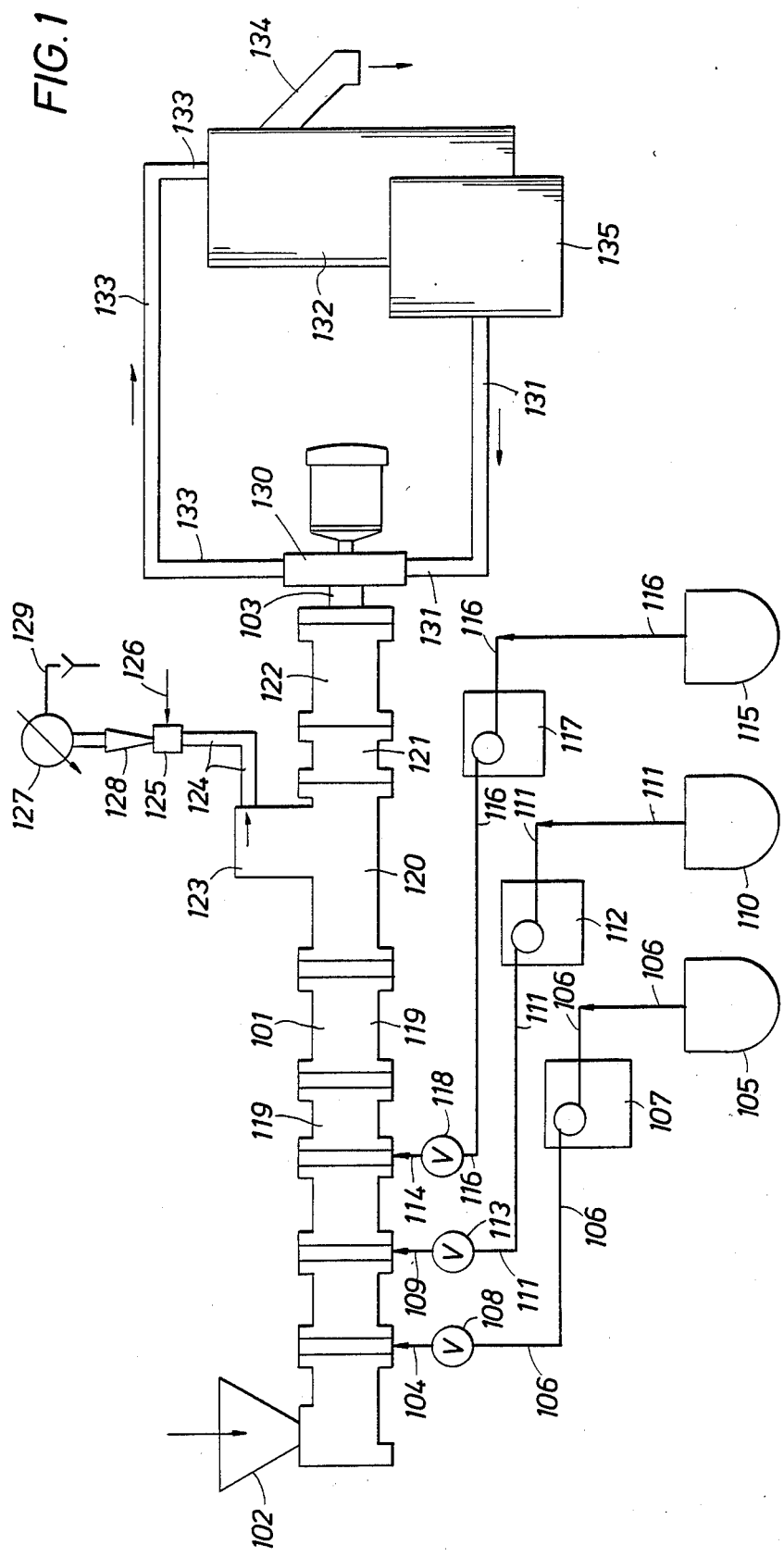
FIG. 1 is a schematic flow diagram of a functionalization process within the scope of the present invention.

As indicated supra, the present invention relates to a process for incorporating carboxyl and carboxyl derivative functionality into a hydrocarbon polymer. As used herein, the recitation carboxyl and carboxyl derivative functionality is intended to encompass any functional group containing a —COO— group or a derivative thereof. Carboxyl and carboxyl derivative functionality may, then, be incorporated into the polymer with an acid or a derivative of an acid such as an anhydride, ester, amide, imide, salt, acyl halide, nitrile and the like. For convenience, a compound capable of imparting carboxyl or carboxyl derivative functionality will sometimes be referred to herein generically as a carboxylic acid reagent. As also indicated supra, the carboxyl or carboxyl derivative functionality will be incorporated into the polymer by reacting the polymer with an ethylenically unsaturated acid or derivative thereof (a carboxylic acid reagent) in the presence of a free radical initiator. Reaction between the polymer and the ethylenically unsaturated acid or derivative thereof will be accomplished in a blending device capable of imparting high mechanical energy such as an extruder or the like and in the presence of a suitable diluent.

In general, any hydrocarbon polymer which is substantially free of ethylenic unsaturation known in the prior art may be treated to incorporate carboxyl or carboxyl derivative functionality therein with the method of this invention. As used herein, a hydrocarbon polymer substantially free of ethylenic unsaturation will be a hydrocarbon polymer containing, on average, less than about 10 carbon, carbon double bonds per polymer chain. In this regard, it should be noted that polymers containing more than this amount of ethylenic unsaturation will, under certain conditions, exhibit excessive crosslinking during a functionalization reaction completed in a blending apparatus capable of imparting high mechanical shear. Useful hydrocarbon polymers, then, include those prepared in bulk, suspension, solution or emulsion. As is well known, polymerization of monomers to produce hydrocarbon polymers may be accomplished using free-radical, cationic and anionic initiators or polymerization catalysts. Incorporation of carboxyl or carboxyl derivative functionality with the method of this invention will, of course, enhance the adhesive properties of the thus treated polymer. Incorporation of carboxyl or carboxyl derivative functionality will also incorporate reactive cites into the polymer which will facilitate cross-linking of the polymer through various condensation reactions. Such crosslinking is, of course, frequently required when the modified polymer is used in various adhesive applications, coating applications, molding applications and the like. Incorporation of carboxyl or carboxyl derivative functionality will further provide cites which may then be subjected to further reactions for the purpose of imparting still different properties to the polymer such as dispersant properties when the polymer is ultimately to be used as a viscosity index improver, in reinforced polymer systems, in a sealant or a coating composition and the like.

In general, the molecular weight of the polymer is not critical to the incorporation of carboxyl or carboxyl derivative functionality therein with the method of the present invention. It should be noted, however, that normally liquid polymers; i.e., polymers which are liquid at standard temperature and pressure do not, generally, process well in blending equipment capable of imparting high mechanical energy such as an extruder. As a result, polymers having a sufficiently high molecular weight as to be solid at standard temperatures and pressures will, generally, be used in the method of this invention. Moreover, it should be noted that degradation resulting from the high shear of the blending apparatus in the presence of a free radical initiator increases with increasing molecular weight of the polymer. The amount of shear degradation is, of course, significantly reduced with the method of this invention and, as a result, the method of this invention may be practiced with higher molecular weight polymers than has heretofore been practicable in extruder processing. Generally, however, the method of this invention will not be used with polymers having a sufficiently large molecular weight as to result in more than about 30% degradation of the polymer. One exception to this would, of course, be that case where degradation of the polymer is a desired result. As a practical matter, however, the advantages of designed extruder degradation in the presence of a free radical initiator is offset significantly by the undesirable coupling which always occurs. In this regard, it has been discovered that when from about 10 to about 30% of the original polymer changes molecular weight from about 40 to about 75% of the polymer which has changed molecular weight will be of a lower molecular weight while from about 60 to about 25% of the polymer which has changed molecular weight will be of a higher molecular weight. In general, linear and branchedchain polymers having weight average molecular weights within the range from about 50,000 to about 300,000 can be conveniently processed in the method of this invention. Radial polymers having weight average molecular weights within the range from about 100,000 to about 1,000,000 can also be conveniently processed in the method of this invention.

In general, any of the hydrocarbon polymers which are substantially free of ethylenic unsaturation known in the prior art can be functionalized with the method of this invention. Such polymers include homopolymers and copolymers of alphaolefins containing from 1 to about 10 carbon atoms, hydrogenated homopolymers and copolymers of diolefins containing from 4 to about 12 carbon atoms, partially, completely and selectively hydrogenated copolymers of one or more conJugated diolefins and one or more monoalkenyl aromatic hydrocarbons containing from 8 to about 16 carbon atoms and the like. As suggested supra, polymers containing ethylenic unsaturation will need to be hydrogenated at least to the extent previously indicated., i.e., to a point where the polymer is substantially free of ethylenic unsaturation, prior to processing in the method of the present invention. Polymers containing both ethylenic and aromatic unsaturation will also be at least selectively hydrogenated so as to saturate a sufficient portion of the ethYlenic unsaturation to render the polymer substantially free of ethylenic unsaturation prior to processing in the method of this invention.

Polymers which may be modified so as to incorporate carboxyl or carboxyl derivative functionality with the method of the present invention include the hydrogenated derivatives of homopolymers and copolymers such as are described in U.S. Pat. Nos. 3,135,716; 3,150,209; 3,496,154; 3,498,960; 4,145,298 and 4,238,202, the disclosure of which patents are herein incorporated by reference. In general, the polymers taught by these patents may be polymers of one or more conjugated dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Preferred conJugated diolefins are those containing 4 to 8 carbon atoms. Moreover, one or more of the hydrogen atoms in the conjugated diolefins may be substituted with halogen. The polymers taught by these patents may also be co-polymers of one or more of the aforementioned conjugated diolefins and one or more other monomers. Other monomers which may be used include aryl-substituted olefins such as styrene, various alkylsubstituted styrenes, alkoxy-substituted styrenes, vinyl naphthalene, alkyl-substituted vinyl naphthalenes and the like. The polymers taught by these references which may be hydrogenated and which would then be useful in the method of the present invention include random polymers, tapered polymers and block copolymers.

Polymers useful in the method of the present invention also include hydrogenated and selectively hydrogenated derivatives of block copolymers such as are taught, for example, in U.S. Pat. Nos. 3,231,635; 3,265,765; 3,322,856 and 3,772,196, the disclosure of which patents are herein incorporated by reference. Polymers which may be modified by incorporating carboxyl and/or carboxyl derivative functionality therein further include hydrogenated and selectively hydrogenated derivatives of radial polymers such as are taught, for example, in U.S. Pat. Nos. 4,033,888; 4,077,893; 4,141,847; 4,391,949 and 4,444,953, the disclosure of which patents are also incorporated herein by reference. Linear block copolymers which may be hydrogenated and then functionalized with the method of this invention may, generally, be represented by the following general formulae:

$$A_z\text{-}(B\text{-}A)_y\text{-}B_x; \text{ and}$$

$$B_x\text{-}(A\text{-}B)_y\text{-}A_z$$

wherein:
A is a polymeric block comprising predominantly monoalkenyl aromatic hydrocarbon monomer units;
B is a polymeric block comprising predominantly conjugated diolein monomer units;
x and z are, independently, a number equal to 0 or 1; and
y is a whole number ranging from 1 to about 15.

Radial polymers which may be hydrogenated and then functionalized with the method of this invention may be represented, generally, by the following general formulae:

$$[B_x\text{-}(A\text{-}B)_y\text{-}A_z]_n\text{-}C; \text{ and}$$

$$[B_x\text{-}(A\text{-}B)_y\text{-}A_z]_{n'}\text{-}C\text{-}[B']_{n''}$$

wherein:
A, B, x, y and z are as previously defined;
n is a number from 3 to 30;
C is the core of the radial polymer formed with a polyfunctional coupling agent;
B' is a polymeric block comprising predominantly conjugated dioelfin units, which B' may be the same or different from B; and
n' and n" are integers representing the number of each type of arm and the sum of n' and n" will be a number from 3 to 30.

As used herein in connection with polymer block composition, predominantly means that the specified monomer or monomer type is the principle, at least about 85 wt %, component in that polymer block.

It will, of course, be appreciated that hydrocarbon polymers, such as those Just discussed, prepared with diolefins will contain ethylenic unsaturation. As indicated supra, such polymers will be hydrogenated prior to reacting the same with an ethlenically unsaturated compound containing carboxyl or carboxyl derivative functionality with the method of this invention. When the polymer is hydrogenated, the hydrogenation may be accomplished using any of the techniques known in the prior art for accomplishing the same. For example, the hydrogenation may be accomplished such that both ethylenic and aromatic unsaturation is converted (saturated) using methods such as those taught, for example, in U.S. Pat. Nos. 3,113,986; 3,595,942 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and Re 27,145. It will, of course, be appreciated that any of these methods could be used to hydrogenate polymers which contain only ethylenic unsaturation and which are free of aromatic unsaturation.

In general, the methods known in the prior art for hydrogenating polymers containing ethylenic unsaturation, which polymers may also contain aromatic unsaturation, involve the use of a suitable catalyst, particularly a catalyst or catalyst precursor comprising a Group VIII metal atom, particularly an iron group metal atom. In the methods described in the foregoing patents, a catalyst is prepared by combining an iron group metal compound with a suitable reducing agent such as an aluminum alkyl. The preferred iron group metal compounds are carboxylates and alkoxides. Also, while aluminum alkyls are the preferred reducing agents, it is known in the prior art that alkyls and hydrides of metals of Groups I, II and III are effective reducing agents, particularly lithium, magnesium and aluminum. As indicated in the foregoing patents, the hydrogenation catalyst is generally prepared by combining the iron group metal compound and the reducing agent in a suitable solvent or diluent before the catalyst is fed to the hydrogenation reactor. Satisfactory results can, however, frequently be obtained by feeding the catalytic components separately into the hydrogenation reactor. In general, the hydrogenation is accomplished in a suitable solvent at a temperature within the range from about 50° to about 160° C. at a hydrogen partial pressure within the range from about 200 to about 800 psig. Hydrogenation conditions are generally continued for a nominal period of time within the range from about 10 to about 240 minutes.

In general, and as indicated supra, any suitable liquid hydrocarbon may be used as a diluent for the polymer being modified in the method of this invention. In general, a liquid hydrocarbon will be a suitable diluent if it is compatible with olefin or polyolefin polymers but not compatible with aromatic hydrocarbon polymers. Such a diluent would, then, tend to swell the olefin monomer portion of the polymer without affecting the aromatic hydrocarbon monomer portion of the polymer when the polymer contains an aromatic portion. The liquid hydrocarbon may be a pure compound but generally will be a blend of compounds such as would be contained in a petroleum distillate fraction. It is, however, important that the diluent remain liquid throughout the processing. It is, therefore, important that the diluent have a boiling point above the maximum temperature that will be encountered during the processing steps. Preferably, the diluent will be a neutral petroleum distillate fraction boiling generally in the fuel oil and/or lubricating oil boiling ranges. More preferably, the diluent will be a neutral, white mineral oil.

Carboxyl or carboxyl derivative functionality can be imparted into the polymer by contacting the polymer in an extruder with an $\alpha$-$\beta$ ethylenically unsaturated carboxylic acid reagent. Suitable $\alpha$-$\beta$ carboxylic acid reagents include the carboxylic acids per se and functional derivatives thereof such as anhydrides, esters, amides, imides, salts, acyl halides, nitriles and the like. The carboxylic acid reagent may be either monobasic or polybasic in nature. When the carboxylic acid reagent is polybasic, it is, preferably, dibasic, although tri- and tetrabasic acids can be used. In general, the carboxylic acid reagent may be linear, branched, cyclic, substituted cyclic, aromatic, or substituted aromatic. In general, the acid portion of the carboxylic acid reagent will contain from 1 to about 12 carbon atoms. Useful monobasic $\alpha$-$\beta$ unsaturated carboxylic acids include acrylic acid, methacrylic acid, cinnamic acid, crotonic acid, 2-phenylpropenoic acid and the like. Useful dibasic acids include maleic acid, fumaric acid, mesaconic acid, itaconic acid, citraconic acid and the like. Functional derivatives corresponding to each of the useful acid are, of course, well known in the prior art and their respective equivalents of the acid for purposes of functionalizing a polymer is taught, for example, in U.S. Pat. Nos. 4,578,429 and 4,670,173. Similarly, methods of making such functional derivatives are also well known to those of ordinary skill in the art. For example, ester derivatives useful in the method of this invention can be made by esterifying monohydric alcohols or epoxides with any of the aforedescribed acids. Corresponding amides can be prepared by pyrolyzing an ammonium salt of the acid or by reacting the corresponding ester, anhydride or acid halide with an amine. The corresponding anhydride can be prepared by dehydrating the acid. Corresponding imides can be prepared by pyrolyzing certain amides. The acid salts can be prepared, for example, by reacting the acid with a metal hydroxide. The corresponding acyl halides can be prepared by reacting the acid or its anhydride with a halogenation agent such as phosphorous tribromide, phosphorous pentachloride, thionylchloride and the like. The corresponding nitriles are generally prepared by dehydrolizing the corresponding amide.

In general, a sufficient amount of carboxylic acid reagent will be combined with the polymer to incorporate from about 1 to about 50 functional groups, on average, per polymer chain. In this regard, it should be noted that the reaction between the carboxylic acid reagent and the polymer generally proceeds stoichiometrically but due to the high viscosity of the reaction medium, the reaction frequently will not proceed to completion. As a result, the amount of carboxylic acid reagent actually used will, generally, exceed the stoichiometric amount required by from about 10 to about 50%.

In general, any of the free radical initiators known in the prior art to be effective in a grafting reaction of the type herein contemplated can be used as the free radical initiator in the method of this invention. Suitable free radical initiators include, then, the various organic peroxides and hydroperoxides as well as the various organic azo compounds. Typical organic peroxides include benzoyl peroxide, t-butyl peroxypivalate, 2,4-dichlorobenzoyl peroxide, decanoylperoxide, propionyl peroxide, hydroxyheptyl peroxide, cyclohexanone peroxide, t-butylperbenzoate, dicumyl peroxide, lauroyl peroxide and the like. Typical hydroperoxides include t-butyl hydroperoxide and 2,5-dimethyl-2,5-bio(butylperoxy)hexane. Typical organic azo initiators include 2,2-azobis(2-methylpropionitrile), 2,2-azobis(2-methylvaleronitrile), 4,4'-azobis(4-cyanovaleric acid) and the like. In general, the free radical initiator will be used in a concentration within the range from about 0.05 to about 0.50 wt % based on polymer.

The polymer, diluent, carboxylic acid reagent and free radical initiator will be contacted at a temperature and pressure sufficient to insure that both the polymer and the carboxylic acid reagent are in the liquid or molten phase when the reaction occurs. The reactants will be contacted in a blending device capable of imparting high mechanical energy such as an extruder, a Banbury mixer, a sigma blade mixer and the like. Generally, sufficent mechanical energy, at the concentration of free radical initiator employed, will be imparted to cause at least a portion of the polymer chains to scission or break. The amount of polymer actually degraded is, however, significantly reduced in the method of this invention.

An embodiment of the invention wherein an extruder is used as the blending apparatus is illustrated in FIG. 1. Referring, then, to FIG. 1 a solid, particulate polymer feed is fed to extruder 101 through feed hopper 102. The polymer feed may be any one or more of the polymers heretofore described. In the extruder, the polymer is heated at least to a temperature at which the polymer becomes molten so that the reaction of the polymer and the carboxylic acid reagent will occur when the polymer is in the molten phase. As is well known, extruders generally contain a plurality of stages and both the temperature and channel depth of the screw may be varied in each of the stages. In general, and in the method of this invention, the temperature may range from about 160° to about 230° C. depending upon the particular polymer being processed while the reaction between the polymer and the carboxylic acid reagent takes place. Variation of the temperature in the different stages of the extruder is not, however, necessary to the method of this invention and, as a result, the temperature will be maintained as nearly constant as possible as the polymer passes through the extruder except that the temperature in the inlet zone, i.e., the zone or zones where the feed materials are introduced may, generally, be maintained somewhat below the reaction zone temperature to maximize the life of the free radical initiator thereby improving grafting efficiency. Also in the extruder, the polymer feed is transported from the feed inlet 102 to the extruder outlet 103 with one or more screw conveyers, not illustrated. In general, the channel depth may be varied within the range from about 0.0005 to about 0.5 times the diameter of the screw housing with maximum depths occurring in those areas where the components are mixed and then again at or near the outlet of the extruder. In transition, the channel depth may be varied to insure that the desired degree of mechanical shear has been imparted on the materials being processed.

As the polymer passes through the blending apparatus, the extruder in the embodiment illustrated in FIG. 1, the polymer first will be combined with a suitable diluent introduced into the extruder through line 104. The diluent is supplied from a suitable vessel 105 through lines 106-106 with pump 107. The amount of diluent actually introduced into the extruder may be controlled with valve 108. In general, the amount of diluent introduced will range from about 5 to about 40 wt % based on polymer feed to the extruder. The solvent or diluent may be any of the liquid hydrocarbons heretofore noted. Also, introduction of the diluent into the extruder before the carboxylic acid reagent or the free radical initiator is important to the method of this invention since, firstly, the solvent or diluent is effective in reducing the amount of scission or degradation of the polymer and secondly the solvent or diluent is effective in reducing the amount of crosslinking or coupling that would otherwise occur. While the inventors do not wish to be bound by any particular theory, it is believed that the diluent effectively reduces degradation as a result of interaction between the diluent and that portion of the polymer where the grafting reaction occurs by reducing the melt temperature of the polymer and effectively reduces crosslinking or coupling by capping free radical sites on the polymer that might otherwise combine. Generally, the diluent will be introduced to the blending apparatus at a point within the range from about 1 D to about 6 D downstream from the point at which the polymer is fed into the extruder-D being the inside diameter of the housing of the blending apparatus, the extruder screws in the embodiment illustrated in the Figure.

As the polymer feed and diluent continue through the extruder, they are next contacted either with a carboxylic acid reagent or a free radical initiator. In the embodiment illustrated, the polymer and diluent are next contacted with the carboxylic acid reagent. Adding of the carboxylic acid reagent prior to adding the free radical initiator is preferred since it has been discovered as a result of this work that addition of the free radical initiator prior to the carboxylic acid reagent will, generally, result in an increased amount of crosslinked or coupled polymer in the product recovered from the blending apparatus. In the embodiment illustrated, the carboxylic acid reagent is introduced into the extruder through line 109. The carboxylic acid reagent is supplied from a suitable storage vessel 110 through lines 111—111 with pump 112. The amount of carboxylic acid reagent introduced into the blending apparatus may be controlled with suitable valve means 113. In general, the carboxylic acid reagent could be fed to the blending apparatus as a solid, as a liquid or as a solution in a suitable solvent. With respect to feeding as a liquid, it should be noted that certain of the carboxylic acid reagents heretofore noted as operable are normally liquid. Those which are solid, however, could be heated and fed in the molten phase. Of the three possible methods of adding, however, addition as a solution is particularly preferred since such addition enables better distribution of the carboxylic acid reagent in the reaction media and reduces the amount of localized reaction between the polymer and the carboxylic acid reagent. In general, carboxylic acid reagent will be introduced into the blending apparatus at a concentration sufficient to incorporate from about 1 to about 50 moles of carboxylic acid reagent, on average, per mole of polymer. As indicated supra, the amount of carboxylic acid reagent introduced into the blending apparatus will, generally, be from about 10 to about 50% more than that required for stoichiometric addition of the carboxylic acid reagent in the amount desired. In general, the carboxylic acid reagent will be introduced into the extruder at a point downstream of the point where the diluent is introduced and within the range from about 1 D to about 8 D downstream of the point where the polymer feed is introduced to the extruder - D being the diameter of the housing for the blending apparatus, in the embodiment illustrated, the screw housing of the extruder. In general, the temperature in the blending apparatus at the point at which the carboxylic acid reagent is introduced is not critical to the method of the present invention. For reasons more fully explained hereinafter, however, the polymer will, preferably, be at a temperature below about 210° C. when the carboxylic acid reagent is introduced.

As the polymer, diluent and, in the embodiment illustrated, the carboxylic acid reagent continue to move through the blending apparatus, the blend is next contacted with a free radical initiator introduced into the extruder through line 114. The free radical initiator is fed from a suitable storage vessel 115 through lines 116—116 with pump 117. The amount of free radical initiator actually introduced into the extruder may be controlled with suitable valve means 118. The free radical initiator may be fed to the blending apparatus in its natural state; i.e., as a liquid or a solid, or as a solution. Most of the free radical initiators contemplated for use in the method of the present invention are, however, liquid and will, generally, be introduced into the extruder in this state. As is well known in the prior art, free radical initiators such as those contemplated for use herein generally have a very short half life at elevated temperatures and frequently even decomposed at temperatures within the range of those contemplated for use herein. As a result, it is important to the method of the present invention to introduce the free radical initiator into the blending apparatus at as low a temperature as reasonably practicable and then relatively quickly thereafter bringing the temperature of the entire blend up to the desired reaction temperature so as to insure maximum efficiency during the grafting reaction. In this regard, maximum reaction efficiency is generally realized when the temperature of the blend with which the free radical initiator is initially contacted is within the range from about 160° to about 210° C. As a result, and as indicated supra, the initial stages of the blending apparatus will be maintained at a maximum temperature within this range so as to insure maximum reaction efficiency. The temperature, will, however, be raised to the desired reaction temperature, when the reaction temperature is higher, as quickly after the free radical initiator is added as is practicable. In general, the free radial initiator will be added at a concentration within the range from about 1 to about 4 moles per moles of polymer. In general, the free radical initiator will also be added at a point downstream of the point where the diluent is introduced and within the range from about 5 D to about 16 D from the point at which the polymer is introduced into the blending apparatus - D being the diameter of the housing for the blender, in the embodiment illustrated the housing of the screw or screws in the extruder. As indicated supra, the free radical initiator will also preferably be introduced into the blending apparatus downstream of the carboxylic acid reagent.

As indicated supra, the channel depth of the extruder screw or screws will, generally, be at or near a maximum in that portion of the apparatus immediately after which the polymer feed is introduced. In fact, this maximum dimension will, generally, be maintained until both the diluent and the carboxylic acid reagent are introduced. The channel depth will, however, then, generally, be reduced in one or more steps prior to addition of the free radical initiator and then will be further reduced after the free radical initiator is introduced. Generally, the channel depth will again begin to increase after the grafting reaction has been completed reaching a second maximum or near maximum to facilitate devolatization at or near the blending apparatus exit. The channel depth will, of course, generally vary somewhat during the reaction stages-such variation being well known and appreciated in the extruder processing arts. In general, the zone 119—119 within which the grafting reaction occurs will have a length within the range from about 1 D to about 6 D, D being the diameter of the housing as previously defined.

As indicated supra, the channel depth in the blending apparatus will, generally, be varied after the grafting reaction is completed as the grafted polymer passes from the reaction zone 119—119 to the blending apparatus outlet 103. Generally, the first such variation in channel depth will be accomplished prior to devolatization of excess reactants and in the embodiment illustrated in the Figure the first such change occurs in zone 120. The second such variation will be made to facilitate pelletization in zone 121 and/or zone 122. It will, of course, be appreciated that changes in channel depth can readily be accomplished, when an extruder is used as the blending apparatus, by changing the screw or screws configuration. Similarly, when other types of blending apparatus are used such changes can be easily accomplished by changing the blender or agitator configuration.

As suggested supra, the effluent from the grafting zone will, generally, contain unreacted carboxylic acid reagent since the grafting reaction rarely proceeds to completion. As is well known, many of the carboxylic acid reagents useful in the method of this invention would be detrimental in many polymer end-use applications if allowed to remain in the polymer product in an ungrafted state. As a result, care should be exercised to separate at least a portion of the unreacted carboxylic acid reagent from the polymer product prior to subsequent use. In general, any of the conventional techniques known in the prior art such as stripping, extraction and the like may be used. Frequently, however, a significant portion of the unreacted carboxylic acid reagent may be separated from the graft reaction zone effluent simply by venting the effluent after the grafting reaction is completed. In the embodiment illustrated in the Figure, a vent 123 is provided in the first zone 120 after the grafting zone for this purpose. In the embodiment illustrated, the vapors passing through vent 123 are passed through lines 124—124 to a steam eductor 125 where the vapors are combined with steam introduced through line 126. As is well known the steam eductor will pull a vacuum on the vent. In general, the vent outlet pressure should be within the range from about 20 to about 300 tor. The vapor-steam mixture is then passed to a condenser 127 through line 128 where the steam vapor mixture is condensed and recovered as a liquid through line 129. It will, of course, be appreciated that other methods of recovering or disposing of the vapor are known in the prior art. In general, the vapor will contain in addition to unreacted carboxylic acid reagent, free radical initiator decomposition products, low molecular weight polymer formed as a result of degradation and the like. In general, venting of the grafting reactor effluent will remove from about 20 to about 80% of the unreacted carboxylic acid reagent contained in the effluent. The temperature in the zone where the effluent is vented could, of course, be increased to increase the vapor pressure of the components to be vented.

In general, the functionalized polymer product will be recovered as a pellet and any of the suitable recovery means known in the prior art may be used for this purpose. In the embodiment illustrated in the Figure, however, an underwater pelletizer with a tempered water system is shown. Referring again to the Figure, then, the functionalized polymer exits the blending apparatus 101 through a suitable outlet 103 and is introduced into the underwater pelletizer at 130 where it is combined with water circulating through lines 131—131. In the embodiment illustrated in the Figure, the polymer water mixture is then passed to spin dryer 132 through lines 133—133. In the spin dryer the polymer pellets are generally dried to a water content within the range from about 100 to about 500 ppm, based on polymer, and then recovered through line 134. Water separated from the polymer pellets may then be returned to a slurry water bath 135 through lines not illustrated from where it may then be recirculated through lines 131—131. Makeup water may be added to the slurry water bath 135 as required using means not illustrated. In those cases where a lower water content would be required, other drying means could be employed. Also, to the extent that the content of unreacted carboxylic acid reagent in the recovered product is higher than desired for a particular end-use application, the recovered polymer could be further processed using techniques well known in the prior art to further reduce the content of unreacted carboxylic acid reagent therein.

In general, any of the various additives known to be useful with polymers of the type which are functionalized in the method of this invention can be incorporated into the functionalized polymer prepared with the method of this invention. Such additives include heat stabilizers, anti-slip agents, antioxidants, anti-static agents, colorants, flame retardants, heat stabilizers, plasticizers, preservatives, processing aids and the like. In general, these agents may be added to the polymer prior to its functionalization in accordance with the method of this invention or after the polymer is functionalized.

PREFERRED EMBODIMENT OF THE INVENTION

In a preferred embodiment of the present invention, a block copolymer comprising at least one polymeric block containing predominantly monoalkenyl aromatic hydrocarbon monomer units and at least one polymeric block containing conjugated diolefin monomer units will be functionalized with an ethylenically unsaturated dibasic carboxylic acid anhydride containing from about 2 to about 10 carbon atoms. In the preferred embodiment, a neutral petroleum distillate fraction boiling within the fuel oil and/or lubricating oil boiling ranges will be used. In a most preferred embodiment, a neutral, white mineral oil will be used as the diluent during the processing. In the preferred embodiment, the oil will be present in the blending apparatus at a concentration within the range from about 10 to about 25 wt % based on polymer. An organic peroxide will be used as the free radical initiator. In the preferred embodiment, the polymeric blocks containing predominantly monoalkenyl aromatic hydrocarbon monomer units will have weight average molecular weights within the range from about 6,000 to about 40,000 and the polymeric blocks containing principally conjugated diolefin monomer units will have weight average molecular weights within the range of about 30,000 to about 70,000. In a most preferred embodiment, the polymer which is functionalized in the method of this invention will be a diblock copolymer having a single polymeric block which is a homopolymer of a monoalkenyl aromatic hydrocarbon monomer, particularly styrene, and a single polymer block which is a homopolymer of a conjugated diolefin monomer, particularly isoprene which is hydrogenated, and the carboxylic acid reagent will be maleic anhydride.

In both the preferred and most preferred embodiments, a twin screw extruder will be used as the blending apparatus. The twin screw extruder will, in effect, have three major zones. In the first major zone, the several components to be blended will be sequentially introduced into the extruder. In the second major zone, the grafting reaction will occur. In the third major zone, volatile-components will be vented from the grafting reaction effluent. In the first major zone, the polymer to be grafted will be introduced into the extruder first. The diluent will then, preferably, be added downstream of the polymer at a point within the range from about 1 D to about 6 D—D being the diameter of the housing of one of the screws, which diameters will be the same in a preferred embodiment. The ethylenically unsaturated carboxylic acid reagent will be introduced next into the extruder at a point downstream of where the diluent is introduced and at a distance from about 1 D to about 8 D downstream from the point of introduction of the polymer. The organic peroxide will be the last component added and the organic peroxide will be added at a point downstream of where the carboxylic acid reagent is introduced and within the range from about 8 D to about 15 D downstream from the point at which the polymer is introduced. The temperature at all points within the first major zone will be controlled within the range from about 25° to about 210° C. and the channel depth in the first zone will be maintained within the range from about 0.5 D to about 0.1 D—D being as previously defined. In the preferred embodiment, the channel depth within the first major zone may be reduced after each of the components to be blended and ultimately reacted are introduced reaching a minimum after the organic peroxide is added and as the blend enters the grafting reaction zone. In the grafting reaction zone the channel depth will be maintained within the range from about 0.0005 D to about 0.08 D—D again as previously defined. In the preferred and most preferred embodiments, the channel depth in the third major zone will increase in steps from the point at which the grafting reaction effluent enters the zone until the grafted product exits the extruder. In the preferred and most preferred embodiments, the channel depth in the third major zone will be maintained within the range from about 0.1 D to about 0.5 D—D again as previously defined. In the preferred and most preferred embodiments, the functionalized polymer will be recovered as a pellet and the recovered product will be further dried to a surface moisture content of 100 ppm or less, based on polymer.

Having thus broadly described the present invention and a preferred and most preferred embodiment thereof, it is believed that the invention will become even more apparent by reference to the following examples. It will be appreciated, however, that the examples are presented solely for purposes of illustration and should not be construed as limiting the invention unless one or more limitations introduced in the examples are incorporated into the claims appended hereto and then only to the extent that such limitations are thus incorporated.

EXAMPLE 1

Figure 2:
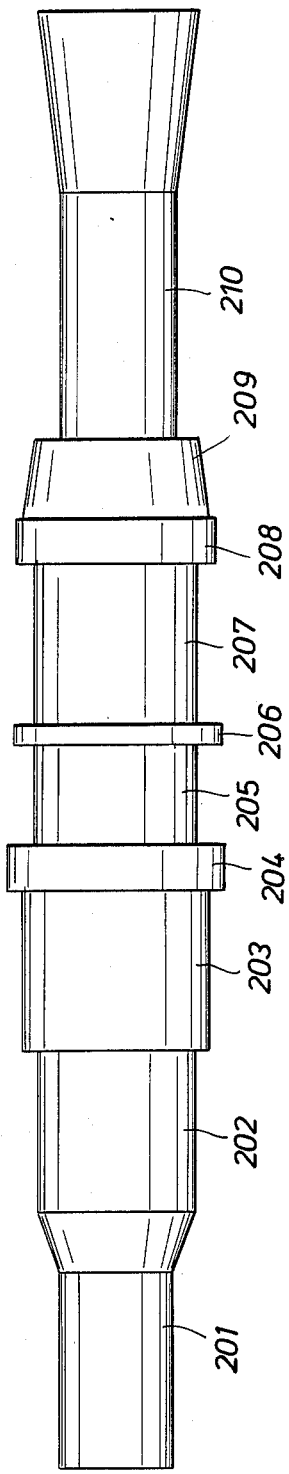
FIG. 2 is a side-elevation view of a blending device useful in a blending apparatus in which the grafting reaction of this invention may be accomplished.

In this example, three grafting runs were completed in a two inch, non-intermeshing, twin screw extruder which was equipped with a devolatilization vent and an underwater pelletizer. The extruder temperature was maintained at about 210° C. in the reaction and outlet zones. The channel depth in the extruder ranged from a low of 0.03 inches at a point in the grafting reaction zone to a maximum of 0.463 inches at both the inlet and the devolatilization zone of the extruder. The screw was approximately 95 inches in length. The screw configuration for each of the twin screws is shown in FIG. 2. Referring then to FIG. 2, the screw is illustrated as having 10 zones or stages, 201–210, with each zone or stage corresponding to a changed channel depth. It should be noted, however, that the zones or stages indicated as 201 and 202 are in effect a single major zone within which each of the components to be blended are introduced into the extruder. The zones or stages designated as 203–209, on the other hand, are in effect a second major zone or stage wherein the grafting reaction occurs. The zone indicated as 210 is a third major zone or stage wherein devolatilization occurs. In the runs completed in this example, the polymer, solvent or diluent and the carboxylic acid reagent were all introduced at points located in zone 1 of FIG. 2 while the free radical initiator was introduced into the extruder in that zone designated 202 in FIG. 2. In each of the runs completed in this example, a diblock copolymer comprising a single polystyrene block having a weight average molecular weight of 33,000 and a single hydrogenated polyisoprene block having a weight average molecular weight of 60,000 was reacted with maleic anhydride in a neutral, white mineral oil and in the presence of 2,5-dimethyl-2,5bis(t-butylperoxy)hexane. In each of the runs completed in this example, the oil was introduced into the extruder at a point approximately 5 diameters from the point at which the polymer was introduced, the maleic anhydride was introduced at a point equal to approximately 5 diameters downstream from the point at which the polymer was introduced and the peroxide was added at a point approximately 10 diameters downstream from the point at which the polymer was introduced. In each of the runs completed in this example, oil was introduced in an amount equal to 20 weight percent based on polymer and maleic anhydride was introduced into the extruder in an amount equal to 1.6 weight percent based on polymer. In the first of the three runs completed in this example, the peroxide was added in an amount equal to 0.10 weight percent based on polymer and in the second and third run completed in this example, peroxide was added in an amount equal to 0.25 weight percent based on polymer. After the runs were completed, the product polymer was analyzed to determine the amount of bound maleic anhydride incorporated into the polymer. The molecular weight was also determined using gel permeation chromatography (GPC) and the fraction of the initial polymer coupled or crosslinked was determined by determining the increase in the high molecular weight fraction while the amount of polymer degraded was determined by determining the reduction in area under the peak molecular weight curve. In that run wherein 0.1 weight percent peroxide was added, the amount of bound of maleic anhydride was determined as 0.2 weight percent while the amount of bound maleic anhydride in the remaining runs were 1.0 weight percent in one case and 0.9 weight percent in the second. When only 0.1 weight percent peroxide was added, no coupling or crosslinking was found. When 0.25 weight peroxide was added, however, 5 percent of the polymer increased in molecular weight in one case and 4 percent in the other. When 0.1 weight percent peroxide was added approximately 12 weight percent of the polymer was degraded while when 0.25 weight percent peroxide was added, 31 weight percent of the polymer was degraded in one case and 30 percent in the other.

COMPARATIVE EXAMPLE 1

In the example, runs identical to those completed in Example 1 with 0.1 and 0.25 weight percent peroxide added were completed except that no oil was introduced into the extruder and the amount of maleic acid actually added was increased slightly to 1.7 weight percent. After the runs were completed, the polymers were analyzed in the same manner as was used in Example 1. In this example, when 0.1 weight percent peroxide was added, 1.1 weight percent maleic anhydride was incorporated into the polymer, 7 weight percent of the polymer increased in molecular weight and 30 percent of the polymer reduced in molecular weight. In that run wherein 0.25 weight percent peroxide was added, 1.4 weight percent maleic anhydride was incorporated into the polymer, 10 weight percent of the polymer increased in molecular weight and 42 weight percent of the polymer was degraded or reduced in molecular weight. As will be apparent from a comparison of the results in the two examples, use of an oil during the grafting reaction reduces the amount of maleic anhydride incorporated into the polymer but also significantly reduces the amount of polymer which is coupled or crosslinked and the amount of polymer that is reduced in molecular weight.

EXAMPLE 2

In this example, a star shaped or radial polymer was maleated in the same apparatus and at the same conditions as was used in Examples 1 and 2. In each of the runs completed in this example, all stages of the extruder were held at a temperature of 230° C. In each of the three runs completed in this example, 20 weight percent, based on polymer, of an oil identical to that used in Example 1 was introduced into the extruder. Also in all three runs, maleic anhydride was added to the extruder in an amount equal to 1.5 weight percent based on polymer. In the first of the three runs, a peroxide identical to that used in Example 1 was added at 0.1 weight percent based on polymer, in the second of the three runs a peroxide identical to that used in Example 1 was added at 0.15 weight percent, based on polymer, and in the third run a peroxide identical to that used in Example 1 was added at a concentration of 0.25 weight percent, based on polymer. In all three runs the polymer contained, on average, 16 hydrogenated isoprene homopolymer arms having weight average molecular weights of 62,000. The arms were coupled with divinylbenzene. After each of the runs were completed, the recovered polymer product was analyzed to determine the amount of maleic acid actually incorporated into the polymer and the molecular weight of the polymers was determined using gel permeation chromatography (GPC). In that run where 0.1 weight percent peroxide was added, 1.2 weight percent maleic anhydride was incorporated into the polymer. In those runs where 0.15 and 0.25 weight percent peroxide were added, 1.4 weight percent maleic anhydride was incorporated into the polymer. While it was not possible to determine the amount of polymer that had coupled or crosslinked or the amount of polymer that had been degraded, it was clear from the molecular weight determination that significant crosslinking or coupling and significant degradation had occurred.

COMPARATIVE EXAMPLE 2

In this example, the run completed in Example 2 wherein 0.10 weight percent peroxide was added was repeated except that no oil was used in this run. After the run was completed, the polymer product was analyzed in the same manner as was used in Examples 1 and 2. As a result of the analysis, it was determined that 0.9 weight percent maleic anhydride had been incorporated into the polymer. It was also determined that a substantial amount of the polymer had crosslinked or coupled and that more than 50 percent of the polymer had degraded. While actual numbers were not determined in Example 2, it is clear that the amount of coupling or crosslinking and the amount of degradation was less when the oil was used.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A method for functionalizing hydrocarbon polymers comprising the steps of:
    (a) contacting 100 parts by weight of a hydrocarbon polymer with a carboxylic acid reagent in the presence of between about 5 and about 400 parts by weight of a suitable diluent and int he presence of a free radical initiator in a blending apparatus selected from the group consisting of extruder, Banbury mixer and sigma blade mixer; and
    (b) recovering a functionalized hydrocarbon polymer.

2. The method of claim 1 wherein the amount of diluent oil present when the polymer is contacted with the carboxylic acid reagent is in the range from about 10 percent by weight to about 20 percent by weight based on the amount of polymer plus carboxylic acid reagent.

3. The method of claim 1 wherein the blending apparatus is an extruder having a screw housing diameter of D and the hydrocarbon polymer is first introduced into the extruder, the diluent is introduced into the extruder at a point downstream from the point at which the polymer is introduced a distance from between about 1 D and about 6 D, the carboxylic acid reagent is introduced downstream from the diluent and downstream from the hydrocarbon polymer at a point within the range from about 1 D to about 8 D from the point at which the polymer is introduced and wherein the free radical initiator is introduced into the extruder downstream from the point at which the diluent is introduced and downstream from where the polymer is introduced a distance within the range from about 5 D to about 16 D from the point at which the polymer is introduced.

4. The method of claim 3 wherein the temperature at all points within the extruder is maintained within the range of from about 160° to about 230° C.

5. The method of claim 4 wherein the channel depth in the extruder is maintained within the range from about 0.0005 D to about 0.5 D.

6. The method of claim 5 wherein said hydrocarbon polymer is a block copolymer comprising at least 1 polymeric block containing predominantly monoalkenyl aromatic hydrocarbon monomer units and at least one polymeric block containing predominantly conjugated diolefin monomer units.

7. The method of claim 5 wherein said hydrocarbon polymer is a radial polymer comprising a plurality of conjugated diolefin arms.

8. The method of claim 5 wherein said carboxylic acid reagent is an ethylenically unsaturated dibasic acid anhydride.

9. The method of claim 8 wherein said carboxylic acid reagent is maleic anhydride.

10. The method of claim 5 wherein said diluent is a lubricating oil.

11. The method of claim 1 wherein the amount of diluent oil present when the polymer is contacted with the carboxylic aid reagent is in the range from about 5 percent by weight to about 25 percent by weight based on the amount of polymer plus carboxylic acid reagent.

12. The method of claim 1 wherein the amount of diluent oil present when the polymer is contacted with the carboxylic acid reagent is in the range from about 5 percent by weight to about 20 percent by weight based on the amount of polymer plus carboxylic acid reagent.

* * * * *